United States Patent
Walton et al.

(12)

(10) Patent No.: US 6,201,588 B1
(45) Date of Patent: Mar. 13, 2001

(54) LIQUID CRYSTAL OPTICAL ELEMENT AND LIQUID CRYSTAL DEVICE INCORPORATING SAME

(75) Inventors: Harry Garth Walton, Cowley; Edward Peter Raynes, Oxford, both of (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/035,350

(22) Filed: Mar. 5, 1998

(30) Foreign Application Priority Data

Jun. 3, 1997 (GB) .................................... 9704623

(51) Int. Cl.⁷ .................... G02F 1/1337; G02F 1/141; G02F 1/13; C09K 19/00
(52) U.S. Cl. ...................... 349/123; 349/134; 349/135; 349/187; 430/20
(58) Field of Search ............................ 349/123, 127, 349/129, 134, 187, 135; 430/321, 20

(56) References Cited

U.S. PATENT DOCUMENTS

| | | | |
|---|---|---|---|
| 4,635,051 | 1/1987 | Bos | 340/757 |
| 5,067,797 | * 11/1991 | Yokokura et al. | 359/76 |
| 5,528,401 | 6/1996 | Narutaki et al. | 359/76 |
| 5,596,343 | * 1/1997 | Walba et al. | 349/123 |
| 5,599,593 | * 2/1997 | Chung | 428/1 |
| 5,808,716 | * 9/1998 | Gass et al. | 349/124 |
| 5,867,237 | * 2/1999 | Yazaki et al. | 349/86 |
| 5,953,091 | * 9/1999 | Jones et al. | 349/129 |
| 5,973,817 | * 10/1999 | Robinson et al. | 359/247 |
| 5,998,101 | * 12/1999 | Park et al. | 430/321 |

FOREIGN PATENT DOCUMENTS

| | | |
|---|---|---|
| 0467456 | 1/1992 | (EP) . |
| 0506175 | 9/1992 | (EP) . |
| 0689084 | 12/1995 | (EP) . |
| 2281405 | 3/1995 | (GB) . |
| WO 96/25470 | * 8/1996 | (WO) . |

OTHER PUBLICATIONS

A. Lien et al.; Asia Display; '95; pp. 593–596, 1995; "UV–Type Two–Domain Wide Viewing Angle TFT/LCD Panels".

J. Chen et al.; SID 95 Digest, pp. 865–868, 1995, "Four–Domain TN–LCD Fabricated by Reverse Rubbing or Double Evaporation".

M. Schadt et al.; JPN. J. Appl. Phys.; vol. 34, Part 2, No. 6B, pp. L764–767; 1995; "Photo–Induced Alignment and Patterning of Hybrid Liquid Crystalline Polymer Films on Single Substrates".

E. P. Raynes et al.; Mol. Cryst. Liq. Cryst.; vol. 56 (Letters); pp. 63–68; 1979; "Voltage Dependence of the Capacitance of a Twisted Nematic Liquid Crystal Layer".

T. J. Scheffer; Phil. Trans. R. Soc. Lond.; A 309; pp. 189–201; 1983; "Guest–Host Devices Using Anisotropic Dyes".

(List continued on next page.)

Primary Examiner—William L. Sikes
Assistant Examiner—Tarifur R. Chowdhury
(74) Attorney, Agent, or Firm—Renner, Otto, Boisselle & Sklar LLP

(57) ABSTRACT

An optical element includes a liquid crystal layer; and at least one alignment layer in contact with the liquid crystal layer, the at least one alignment layer being formed from a mixture including a first reactive mesogen and a second reactive mesogen. Each of the first and second reactive mesogens have at least one polymerizable functional group, and a number of polymerizable functional groups of the second reactive mesogen is smaller than that of the first reactive mesogen. A ratio of the second reactive mesogen to the first reactive mesogen in the mixture is determined so as to provide a predetermined pretilt angle with liquid crystal molecules in the liquid crystal layer.

16 Claims, 6 Drawing Sheets

OTHER PUBLICATIONS

T. Uchida et al.; IEEE Transactions On Electron Devices; vol. Ed–26; No. 9; pp. 1373–1374; 1979; "Guest–Host Interactions in Nematic Liquid Crystals With Negative Dielectric Anisotropy".

T. Uchida et al.; Japanese Journal of Applied Physics; vol. 19; No. 11; pp. 2127–2136; 1980; "Liquid Crystal Orientation on the Surface of Obliquely–Evaporated Silicon Monoxide With Homeotropic Surface Treatment".

L. M. Blinov et al.; Electrooptic Effects In Liquid Crystals Materials; Chapter 3; 1994.

M. Schadt et al.; Nature; vol. 381; pp. 212–215; 1996; "Optical Patterning of Multi–Domain Liquid–Crystal Displays With Wide Viewing Angles".

* cited by examiner

LIQUID CRYSTAL OPTICAL ELEMENT AND LIQUID CRYSTAL DEVICE INCORPORATING SAME

BACKGROUND OF THE INVENTION

1. Field of the Invention

This invention relates to a liquid crystal optical element and to a liquid crystal device incorporating same, and is more particularly concerned with a liquid crystal optical element comprising a liquid crystal layer and at least one alignment layer for alignment and tilt angle control of adjacent liquid crystal molecules in the liquid crystal layer. This invention is particularly, but not exclusively, concerned with active liquid crystal devices, i.e. liquid crystal devices having a liquid crystal layer which is field-switchable to change an optical property of the layer.

2. Description of the Related Art

It is very well known to provide a rubbed alignment layer to control the alignment and pretilt angle of adjacent liquid crystal molecules in a liquid crystal layer. However, the control of the pretilt angle requires the use of specific combinations of the liquid crystal layer and the alignment layer. It can be difficult to achieve very high pretilt angles with sufficient control by this method.

Various other methods, which do not require rubbing of the alignment layer in contact with the liquid crystal layer, have also been previously proposed.

EP-A-0689084 discloses liquid crystal devices having multiple alignment layers. One alignment layer is a photo-orientated polymer network (PPN) layer which is cured using linearly polarised light to effect anisotropic polymerisation of a monomer. Another alignment layer is formed of a photo-cured mixture of diacrylate liquid crystal monomers. The use of such a mixture is to provide a supercoolable nematic mixture which allows the LC layer to be produced at room temperature. Such alignment layer is produced by dissolving the diacrylate liquid crystal monomers with a photoinitiator in a solvent and applying the mixture to a previously-produced rubbed lower alignment layer by spin coating. This is followed by photo-curing so as to fix the orientation imparted to the liquid crystal monomer molecules by the underlying lower alignment layer. However, there is no teaching concerning control of the tilt angle produced by any of the alignment layers.

EP-A-0 506 175 provides an alignment layer consisting of an oriented polymer network in which a non-reactive liquid crystalline material is dispersed. The alignment layer is formed from a mixture of a reactive liquid crystalline material and a non-reactive liquid crystalline material. There is no teaching concerning control of the tilt angle produced by the alignment layer.

U.S. Pat. No. 5,528,401 relates to controlling the tilt angle produced by an alignment layer. The material from which the alignment layer is formed comprises a liquid crystal material and a polymerising material. The tilt angle is controlled by polymerising the polymerisable material while applying an electric or magnetic field to control the tilt angle of the liquid crystal molecules.

In M. Schadt et al, Nature, Vol. 381 May 16, 1996, pages 212 to 215, there is disclosed a modification of the PPN technique wherein, to enable pretilt angle control, novel photo-prepolymer molecules containing a coumarin moiety are employed. These photo-prepolymer molecules not only polymerise at a polymerisable moiety at one end of the molecule, but they also cross-link by fusing together in various configurations at the pyrone ring of the coumarin moiety. However, this technique requires the use a specialised monomer and also requires directional control over the incident cross-linking UV radiation.

EP-A-0467456 discloses that the pretilt angle of liquid crystal molecules in an adjacent liquid crystal layer can be controlled by controlling the thickness of a liquid crystalline auxiliary alignment layer which is spin formed on a glass substrate to which a polyimide alignment layer has been applied. The auxiliary alignment layer contains a diacrylate liquid crystal monomer, a photoinitiator and a liquid crystal material having a surface-active group such as an aliphatic chain which is directed towards an exposed surface of the auxiliary alignment layer. This can enable relatively high pretilt angles (i.e. relatively high angles relative to the plane of the alignment layer) to be achieved for liquid crystal molecules in the adjacent active liquid crystal layer. However, control of the pretilt angle requires a precise control over the thickness of the spun layer, which is difficult.

In some instances, it is desired for the molecules of the liquid crystal active layer to align on a surface with their long molecular axes normal to the surface (so called "homeotropic alignment"). Methods of achieving homeotropic alignment of common liquid crystal materials are described by L. M. Blinov et al in "Electrooptic Effects in Liquid Crystal Materials", Springer Verlag, New York Inc—Chapter 3, 1994.

In some instances, it is desirable to achieve a slight tilt (typically 1–10°) away from the homeotropic (90°) alignment. Dyed guest-host displays utilising tilted-off homeotropic alignment and negative dielectric anisotropy liquid crystal mixtures have a number of attractive features including slightly improved multiplexibility and brightness. Although this "tilted-off" homeotropic alignment can be achieved via the oblique evaporation of a layer of silicon oxide onto a glass substrate [see T. Uchida et al, Japanese journal of Applied Physics, Vol. 19, No. 11, November 1980, pp 2127–2136, T. Uchida et al, IEEE Transactions on Electronic Devices, Vol. Ed-26, No. 9, September 1979, pp 1373–1374, T. J. Scheffer, Phil. Trans. R. Soc. Lond., A 309, 189–201 (1983), and U.S. Pat. No. 4,635,051], it requires special equipment and there is generally no reliable way of reproducibly achieving such tilted-off homeotropic alignment over large areas.

SUMMARY OF THE INVENTION

It is an object of the present invention to provide a way of controlling the degree of tilted-off homeotropic alignment in a manner which is both simple and suitable for a very wide variety of applications, and which is also convenient to employ using existing liquid crystal device fabrication technology.

According to one aspect of the invention, an optical element includes a liquid crystal layer; and at least one first alignment layer in contact with the liquid crystal layer, the at least one first alignment layer being formed from a mixture including a first reactive mesogen and a second reactive mesogen. Each of the first and second reactive mesogens have at least one polymerizable functional group, and a number of polymerizable functional groups of the second reactive mesogen is smaller than that of the first reactive mesogen. A ratio of the second reactive mesogen to the first reactive mesogen in the mixture is determined so as to provide a predetermined pretilt angle to liquid crystal molecules in the liquid crystal layer.

In one embodiment of the invention, the first reactive mesogen is a liquid crystal molecule having at least one polymerizable functional group at each end thereof.

In one embodiment of the invention, the second reactive mesogen is a liquid crystal molecule having at least one polymerizable functional group at only one end thereof.

In one embodiment of the invention, the second reactive mesogen is a liquid crystal molecule having a single polymerizable functional group at only one end thereof.

In one embodiment of the invention, the at least one polymerizable functional group of the first and second reactive mesogens is selected from a group consisting of an acrylate group, a methacrylate group, a vinyl ether group and an epoxy group.

In one embodiment of the invention, the at least one polymerizable functional group of the first and second reactive mesogens is an acrylate group.

In one embodiment of the invention, the first reactive mesogen is a diacrylate and the second reactive mesogen is a monoacrylate.

In one embodiment of the invention, the ratio of the second reactive mesogen is substantially from greater than 0 wt % to equal to or less than 40 wt % of a total weight of the first and second reactive mesogens.

In one embodiment of the invention, the ratio of the second reactive mesogen is substantially from equal to or greater than 5 wt % to equal to or less than 40 wt % of the total weight of the first and second reactive mesogens.

In one embodiment of the invention, the ratio of the second reactive mesogen is substantially from equal to or greater than 10 wt % to equal to or less than 30 wt % of the total weight of the first and second reactive mesogens.

In one embodiment of the invention, the ratio of the second reactive mesogen is substantially from equal to or greater than 20 wt % to equal to or less than 30 wt % of the total weight of the first and second reactive mesogens.

According to another aspect of the invention, a liquid crystal display device includes an optical element including a liquid crystal layer; and at least one alignment layer in contact with the liquid crystal layer, at least one alignment layer being formed from a mixture including a first reactive mesogen and a second reactive mesogen. Each of the first and second reactive mesogens have at least one polymerizable functional group, and a number of polymerizable functional groups of the second reactive mesogen is smaller than that of the first reactive mesogen. A ratio of the second reactive mesogen to the first reactive mesogen in the mixture is determined so as to provide a predetermined pretilt angle with liquid crystal molecules in the liquid crystal layer. The liquid crystal display device further includes a pair of electrodes opposing each other with the liquid crystal layer interposed therebetween. The liquid crystal layer is an active layer.

According still another aspect of the invention, a liquid crystal display device includes a liquid crystal layer; alignment layers disposed on opposite sides of the liquid crystal layer, at least one of said alignment layers being formed of a mixture including first reactive mesogen and a second reactive mesogen; and a pair of electrodes opposing each other with the liquid crystal layer interposed therebetween. Each of the first and second reactive mesogens have at least one polymerizable functional group, and a number of polymerizable functional groups of the second reactive mesogen is smaller than that of the first reactive mesogen. A ratio of the second reactive mesogen to the first reactive mesogen in the mixture is determined so as to provide a predetermined pretilt angle with liquid crystal molecules in the liquid crystal layer.

According to still another aspect of the invention, a method for producing an optical element includes steps of (i) forming a layer from a mixture including a first reactive and a second reactive mesogen; (ii) polymerizing the first and second reactive mesogens to form an first alignment layer; and (iii) providing a liquid crystal layer on the alignment layer. Each of the first and second reactive mesogens has at least one polymerizable functional group, and a number of polymerizable functional groups of the second reactive mesogen is smaller than that of the first reactive mesogen. The step (i) includes a step of determining a ratio of the second reactive mesogen to the first reactive mesogen in the mixture so as to provide a predetermined pretilt angle to liquid crystal molecules in the liquid crystal layer.

In one embodiment of the invention, the step (i) includes steps of (a) forming a second alignment layer on a substrate; and (b) providing the mixture of the first and second reactive mesogens on the second alignment layer whereby forming the layer of the mixture.

In one embodiment of the invention, the step (i) is effected using said mixture with a liquid diluent.

In one embodiment of the invention, the liquid diluent is preset in an mount of about 5 to 20 parts by weight per part by weight of the mixture including the first and second reactive mesogens.

In one embodiment of the invention, the optical element further includes a second alignment layer provided on a substrate, the second alignment layer having a first region and a second region. A pretilt direction of molecules at a surface of the first region and a pretilt direction of molecules at a surface of the second region are different from each other. The first alignment layer is provided on the second alignment layer.

In one embodiment of the invention, the optical element further includes a second alignment layer provided on a substrate, the second alignment layer having a first region and a second region. A pretilt angle of molecules at a surface of the first region and a pretilt angle at a surface of molecules at the second region are different from each other. The first alignment layer is provided on the second alignment layer.

In one embodiment of the invention, the optical element further includes a second alignment layer provided on a substrate, the second alignment layer having a first region and a second region. A pretilt direction of molecules at the first region and a pretilt direction of molecules at the second region are different from each other. A pretilt angle of molecules at the first region and a pretilt angle of molecules at the second region are different from each other. The first alignment layer is provided on the second alignment layer.

In one embodiment of the invention, the step (a) includes at least one of steps of: (c) providing molecules at a surface of a first region of the second alignment layer with a first pretilt direction and providing molecules at a surface of a second region of the second alignment layer with a second pretilt direction, (d) providing molecules at the surface of the first region of the second alignment layer with a first pretilt angle and providing molecules at the surface of the second region of the second alignment layer with a second pretilt angle. The first pretilt direction and the second pretilt direction are different from each other. The first pretilt angle and the second pretilt angle are different from each other.

According to one aspect of the present invention, there is provided an optical element comprising a liquid crystal layer and at least one alignment layer, wherein said alignment layer is formed from a mixture of first and second polymerisable liquid crystal monomers (hereinafter called "the first reactive mesogen" and "the second reactive mesogen"), wherein the second reactive mesogen has a lower polymerisation functionality than the first reactive mesogen.

The first reactive mesogen is preferably a liquid crystal molecule having a polymerisation functionality provided by at least one polymerisable moiety at each end thereof.

The second reactive mesogen is preferably a liquid crystal molecule having polymerisation functionality provided by at least one polymerisable moiety (more preferably, a single polymerisable moiety) at only one end thereof.

The polymerisation functionality may be provided by an acrylate group (including a methacrylate group), a vinyl ether group or an epoxy group. However, it is preferably provided by an acrylate group.

In a preferred embodiment, the first reactive mesogen is a diacrylate and the second reactive mesogen is a monoacrylate.

The alignment layer may be formed using per se known techniques such as by spin-coating a mixture of the first and second reactive mesogens and a photoinitiator in a solvent or carrier onto a pre-formed alignment layer such as a rubbed polyimide layer.

It is found that the higher the proportion of the secondary active mesogen, the higher the pretilt angle which can be achieved up to a certain limit. The second reactive mesogen may be present in an amount of up to about 40 wt % of the total weight of the first and second reactive mesogens, more preferably about 5 to 40 wt %, and most preferably about 10 to 30 wt %. For very high pretilt angles (i.e., for use where low tilted-off homeotropic alignment is required), the second reactive mesogen may be present in an amount of about 20 to 30% by weight.

According to a second aspect of the present invention, there is provided a liquid crystal display device comprising a liquid crystal layer, alignment layers disposed on opposite sides of the liquid crystal layer, and means for applying a field across the liquid crystal layer, wherein at least one of said alignment layers is formed a cured mixture of first and second reactive mesogens, wherein the second reactive mesogen has a lower polymerisation functionality that the first reactive mesogen.

According to a third aspect of the present invention, there is provided a method of producing an optical element comprising the steps of forming a layer of a mixture of first and second polymerisable liquid crystal monomers (reactive mesogens) on a substrate; polymerising the reactive mesogens whereby to form an alignment layer; and providing a liquid crystal layer on the alignment layer, wherein the second reactive mesogen has a lower polymerisation functionality than the first reactive mesogen.

Thus, the invention described herein makes possible the advantages of providing a manner for controlling the degree of tilted-off homeotropic alignment which is both simple and suitable for a very wide variety of applications, and which is also convenient to employ using existing liquid crystal device fabrication technology.

These and other advantages of the present invention will become apparent to those skilled in the art upon reading and understanding the following detailed description with reference to the accompanying figures.

DESCRIPTION OF THE PREFERRED EMBODIMENTS

In the following Examples, a "reactive mesogen" refers to a molecule including at least one mesogenic group and at least one polymerizable functional group bonded to the mesogenic group.

Figure 1:
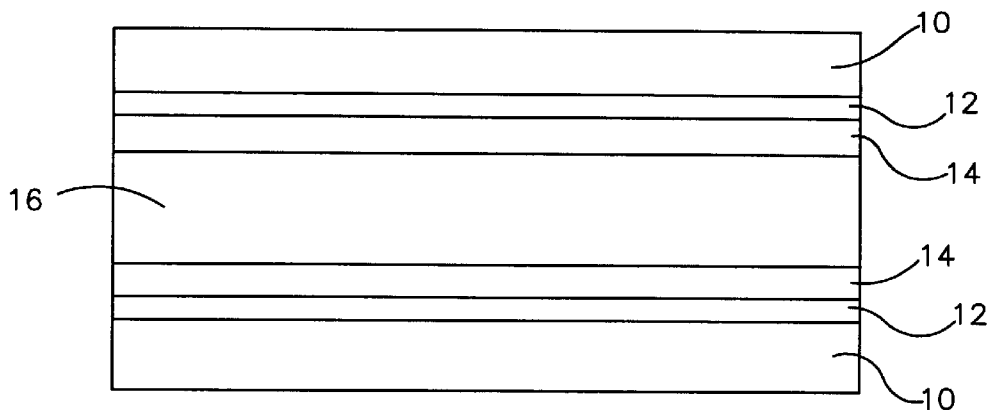
FIG. 1 is a schematic view of a liquid crystal cell incorporating an optical element according to the present invention.

Referring now to FIG. 1, there is shown a liquid crystal cell comprising a pair of spaced ITO-coated glass substrate plates 10 each having a polyimide alignment layer 12 thereon and an overlying polymeric liquid crystal alignment layer 14. A liquid crystal liquid 16 fills the cell so as to contact both alignment layers 14.

EXAMPLE 1

In the production of the cell of FIG. 1, two commercially available diacrylate reactive mesogen materials (RM257 and RM258—Merck & Co. Ltd.) and two monoacrylate reactive mesogen materials (RM305 and RM308) were used. Four permutations of diacrylate/monoacrylate mixtures were made up, with the monoacrylates present in an amount of 30% by weight of each mixture (see the Table below). Each acrylate mixture was dissolved in toluene in the ration of 1 part of the acrylate mixture to 6 parts toluene (by weight). A small amount (~1% wt:wt) of a photoinitiator (Daracure 4265—Ciba Geigy) was added and a few drops of the resulting liquid were spun (5 krpm, 10 seconds) onto the plates 10 each of which had previously been coated with a polyimide (P12555—DuPont). Such coating with P12555 was effected by dissolving the P12555 in 20 parts by weight of a proprietary solvent (T39039—DuPont) and filtering the solution down to 0.2 $\mu$m using PTFE filters. A few drops of this solution were spun (4 krpm, 40 seconds) onto the glass plates 10 which had been cleaned using a combination of sodium hydroxide solution, de-ionised water and propanol). The glass plates 10 were purchased precoated with a thin layer of transparent conducting indium tin oxide (ITO), a material used to form transparent electrodes in almost all LCD devices. The plates 10 were then baked at 90° C. for 30 minutes to drive off excess solvent and then at 250° C. for 1.5 hours to induce imidisation of the P12555. The polyimide film was then unidirectionally rubbed with a soft cloth to induce unidirectional alignment.

Following spin-coating of the acrylate mixture layers, the plates 10 were exposed to UV light in a nitrogen atmosphere, to induce photopolymerisation. The resultant spun and cured acrylate layers 14 were typically on the order of 100nm thick. Two plates 10 were prepared for each diacrylate/monoacrylate mixture, and the plates 10 were assembled into four (antiparallel rubbed) liquid crystal cells. Each cell was capillary filled with the nematic liquid crystal mixture "E7" (Merck Ltd) to provide the layer 16 and the pretilt of the cell measured using standard techniques (the well known "crystal rotation method" and canoscopy). E7 is a known mixture of four cyanobiphenyls and is described in greater detail by E. P. Raynes et al in Mol. Cryst. Liq. Cryst., Vol. 56 (Letters), 1979, pages 63–68.

The results are shown in the Table below:

| Mixture | Pretilt Angle (degrees) |
| --- | --- |
| RM257 + 30%(wt:wt)RM305 | 86.4 |
| RM257 + 30%(wt:wt)RM308 | 88.2 |
| RM258 + 30%(wt:wt)RM305 | 86.1 |
| RM258 + 30%(wt:wt)RM308 | 89.2 |

It is preferable to set the ratio of the monoacrylate in a range substantially from greater than 0 wt % to equal to or less than 40 wt % of a total weight of the diacrylate and monoacrylate in the alignment layer 14. Setting the ratio within the range, the alignment layer 14 provides a desired pretilt angle to the liquid crystal molecules in the vicinity of the interface between the alignment layer 14 and the liquid crystal layer 16. As indicated above, it is preferable in the homeotropic liquid crystal cells that the pretilt angle of liquid crystal molecules be in the range from equal to or greater than 80° to less than 90°. Therefore, a liquid crystal display device with high display quality is obtained according to the present invention. It is more preferable to set the ratio of the monoacrylate in the range substantially from 5 wt % to 40 wt % of the total weight of the diacrylate and monoacrylate. In addition, if the range is substantially from 20 wt % to 30 wt %, the advantages of the present invention are more pronounced.

When the alignment layer is formed from a mixture including diacrylate (e.g., RM257) with no added monoacrylate, it results in a zero degree pretilt angle (i.e., planar alignment) of the liquid crystal molecules. That is, a homeotropic alignment is not obtained. The pretilt angle of the liquid crystal molecules adjacent to the alignment layer is substantially 90° when the weight ratio of the monoacrylate to the total weight of the diacrylate and monoacrylate exceeds 40 wt %. In this case, it is impossible to control the falling direction of the liquid crystal molecules when a voltage is applied across the liquid crystal layer. This adversely affects the display quality as mentioned above. Therefore, it is preferable that the ratio of the monoacrylate is in the range substantially from 0 wt % to 40 wt % of the total weight of the diacrylate and monoacrylate.

As polymerizable functional groups included in the reactive mesogens, an acrylate group, a methacrylate group, a binyl ether group and an epoxy group may be available. However, the polymerizable functional groups of the mesogens are not limited thereto as long as at least two mesogens having a different number of polymerizable functional groups are used in the mixture.

EXAMPLE 2

Figure 2:
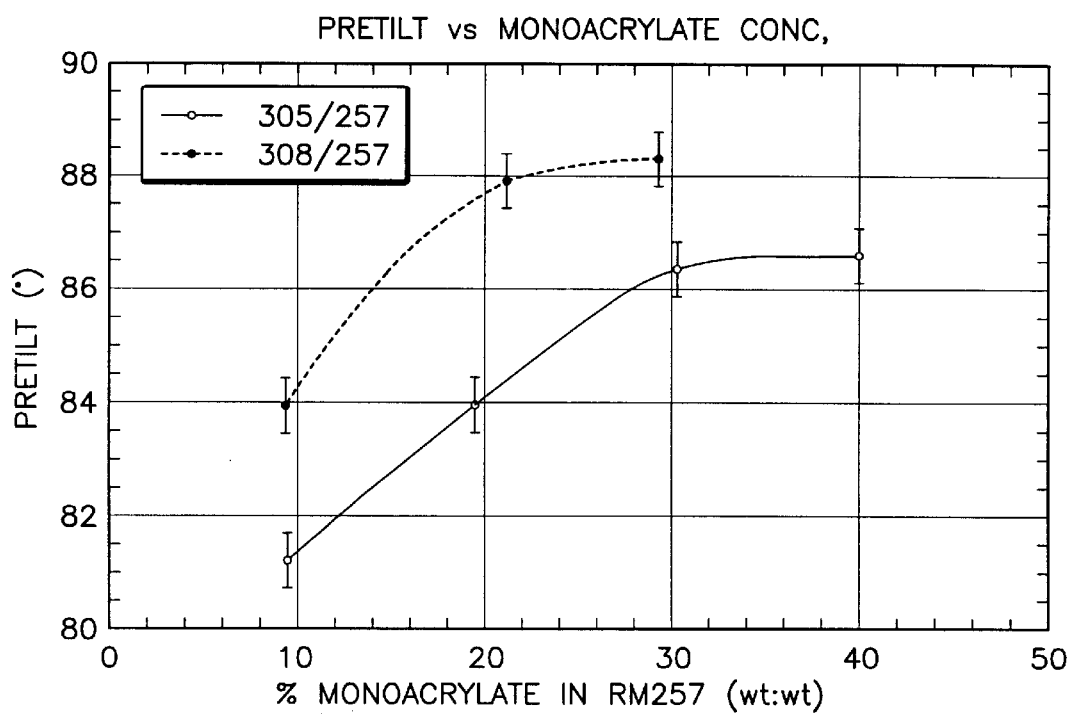
FIG. 2 is a graph plotting pretilt against monoacrylate concentration in a reactive mesogen composition containing monoacrylate and diacrylate reactive mesogens.

Liquid crystal cells were prepared as in Example 1, using mixtures of RM257+RM305 and RM257+RM308. In this case however, the weight percentage of the monoacrylate added to the diacrylate was varied. The variation of pretilt is shown in FIG. 2. The variation in weight percentage is shown along the horizontal axis and the variation in pretilt angle is shown in the vertical axis.

EXAMPLE 3

Figure 3:
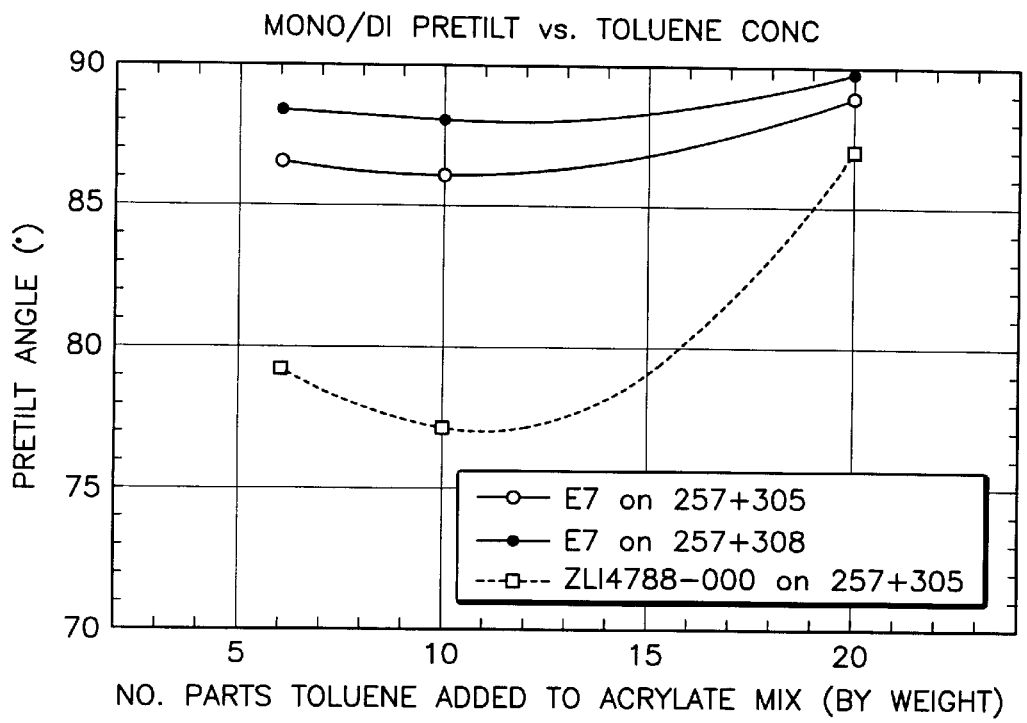
FIG. 3 is a graph plotting pretilt against toluene concentration in a reactive mesogen composition containing monoacrylate and diacrylate reactive mesogens.

Liquid crystal cells were prepared as in Example 1 using mixtures of RM257+RM305 and RM257+RM308. In this case, however, the number of parts (by weight) of toluene used to dilute the acrylate-mix was varied. Some cells were filled with E7 while others were filled with the nematic liquid crystal material ZL14788-000 (a negative delta-epsilon ($\Delta\epsilon$) material available from Merck Ltd.). The results are shown in FIG. 3.

Figure 4:
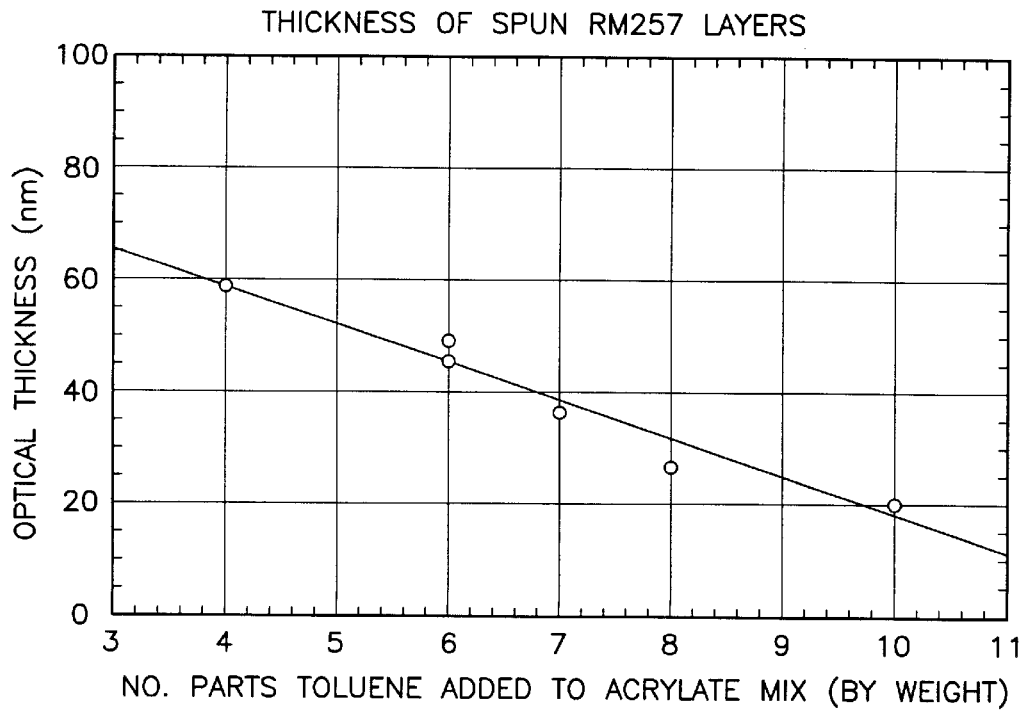
FIG. 4 is a graph plotting optical thickness against toluene concentration in a reactive mesogen composition containing monoacrylate and diacrylate reactive mesogens.

A variation in the amount of toluene used as solvent when spinning a reactive mesogen (RM) layer can also cause a variation of the layer thickness, and hence optical birefringence. FIG. 4 shows the variation in optical thickness of a layer of RM257 as a function of the number of parts of toluene used to dilute the RM257. Spinning was for 10 seconds at 5 krpm, onto glass plates 12 which had previously been coated with polyimide (P12555) and rubbed, to induce alignment of the RM257 molecules.

EXAMPLE 4

A cell was prepared as in the above Examples, with alignment layers RM257+30% (wt:wt) RM305, spun from toluene (6 parts toluene: 1 part acrylate mix, by weight). The cell was assembled with rubbing directions parallel and a cell gap of approximately 5 microns. It was filled with the negative dielectric anisotropy material ZL14788-000 (Merck Ltd), containing 2% (wt:wt) LSB 278 (a blue dye from Mitsui Ltd).

From FIG. 3, it is shown that the ZL14788-000 mixture will align with a pretilt in the region of 87° for a cell prepared in this way using the mixture of reactive mesogens (1 part by weight) and toluene (20 parts by weight).

FIG. 5 shows details of an experimental apparatus used to investigate the electro-optic switching characteristics of such a device, consisting of a pair of glass substrates 10, each coated with an ITO electrode 18, a rubbed polyimide layer 12, and the polymerised reactive mesogens alignment layer 14. A liquid crystal layer 16 comprising liquid crystal molecules 20 and dye molecules 22 was confined within the cell between and in contact with the layers 14.

Figure 5A:
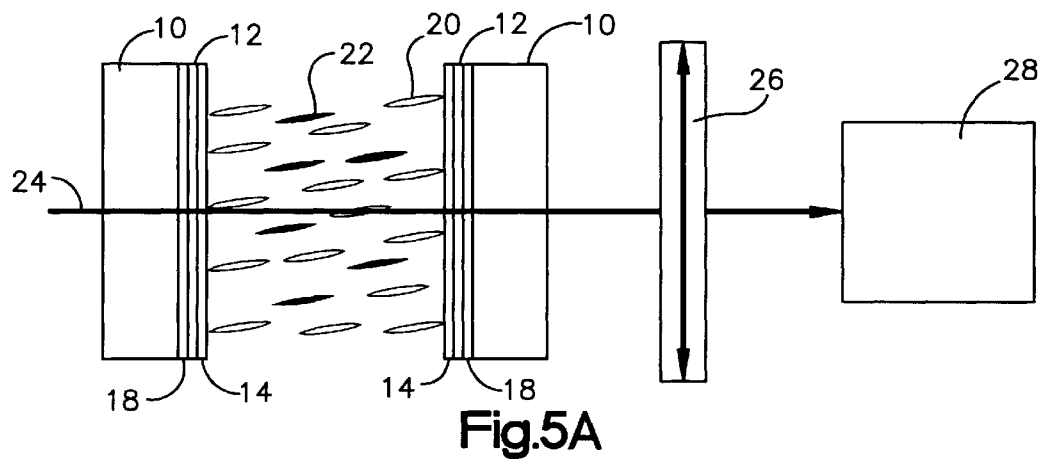
FIGS. 5A, 5B and 5C are views showing the liquid crystal states during operation of an experimental liquid crystal device incorporating an optical element according to the present invention.
Figure 5B:
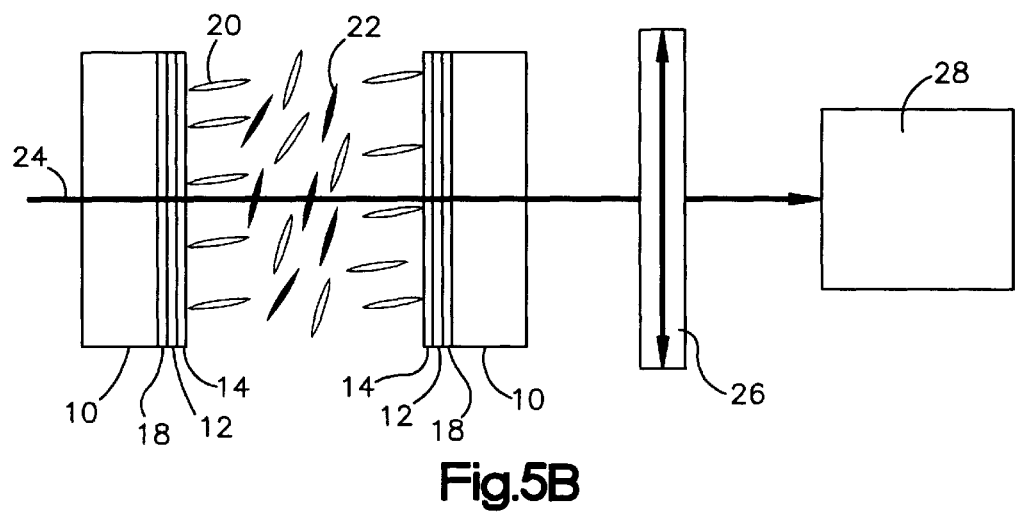
Figure 5C:
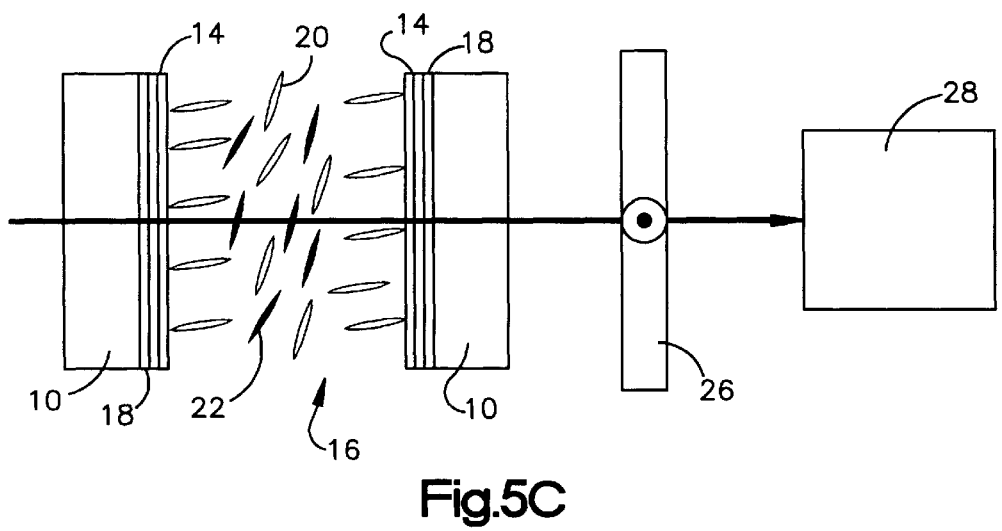

A beam of light 24 passes through the cell, then through a polariser 26 and finally into a light meter 28. FIGS. 5A and 5B illustrate the cell respectively without and with an electric field applied across the ITO electrodes 18, with the polariser 26 set with its polarisation axis in the plane of the drawing. The LC molecules 20 at the surface of each of the layers 14 are shown pretilted at some high angle (nearly 90°). When an electric field is applied between the electrodes 18 (FIG. 5B), the negative dielectric anisotropy LC molecules 20 in the cell reorient to lie perpendicular to the field, and tend to co-operatively reorient adjacent dye molecules 22. The dye molecules 22 are positive dichroic molecules and thus absorb light polarised along their long axes. Consequently, in going from the situation depicted in FIG. 5A (i,e. no voltage), to that in FIG. 5B (with voltage), the light meter 28 will register a decrease in optical transmission, since light polarised in the plane of the drawing is absorbed by the dye molecules 22 lying in the plane of the drawing. If the polariser 26 is rotated through ninety degrees however (see FIG. 5C), the light meter 28 will detect no change in transmission between the voltage-on and voltage-off states, since the polariser axis lies orthogonal to the plane in which the dye absorption axis lies.

Figure 6:
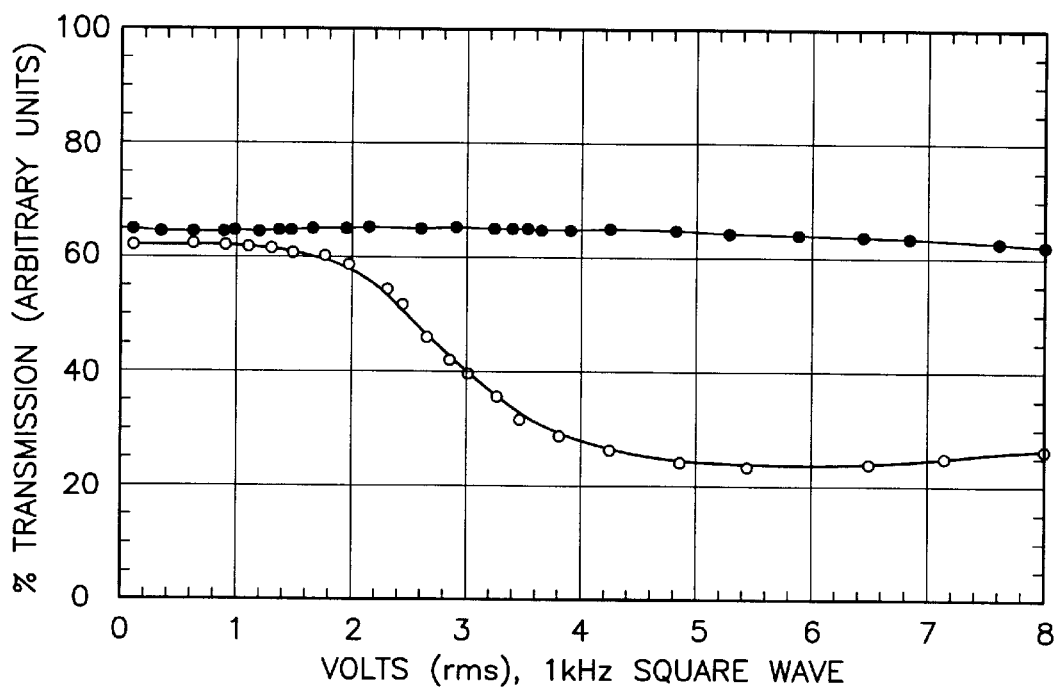
FIG. 6 is a graph plotting percentage transmission against voltage applied during use of the apparatus of FIGS. 5A to 5C.

FIG. 6 shows actual experimental results for the ZL14788-000+2% LSB278 cell described above. The open circles show the situation depicted schematically in FIGS. 5A and 5B as the applied voltage was varied. The closed circles show the situation depicted schematically in FIG. 5C. The device described here is commonly called a 'positive switching Heilmeier display' (see T. J. Sheffer, supra), although experimental demonstrations of this mode have previously been limited by the lack of suitable tilted-off homeotropic alignment surfaces.

It is apparent that the alignment layer 16 described herein in no way restricts the choice of dye and/or liquid crystal that can be included with the dye guest-host display. For example, dyes can be chosen with any desired colour, with mesogenic properties, with negative dielectric anisotropies (enhancing their tendency to align parallel to the glass plates in FIGS. 5B and 5C when an electric field is applied) and with the axis of principal absorption lying at an angle relative to the long molecular axis (i.e. positive or negative dichroic dyes can be used). The liquid crystal used may contain chiral dopants, added to induce a change in the electrooptic characteristics of a display (see T. J. Scheffer, supra). Adding the chiral dopant to the liquid crystal, the 90° twisted Heilmeier display and its supertwisted counterpart (i.e. the twist aggie, β, lies typically in the range 180°≦β≦270°) are produced.

EXAMPLE 5

A further application of the present invention is illustrated with reference to FIGS. 7A and 7B. These figures show a well known liquid crystal switching mode, namely the "end" Freedericksz transition. In the device shown in FIGS. 7A and 7B a layer 16 of liquid crystal having a negative dielectric anisotropy is confined between two glass substrates 10. Each substrate is coated with a transparent electrically conductive electrode 11 and an alignment layer 13.

Figures 7A, 7B:
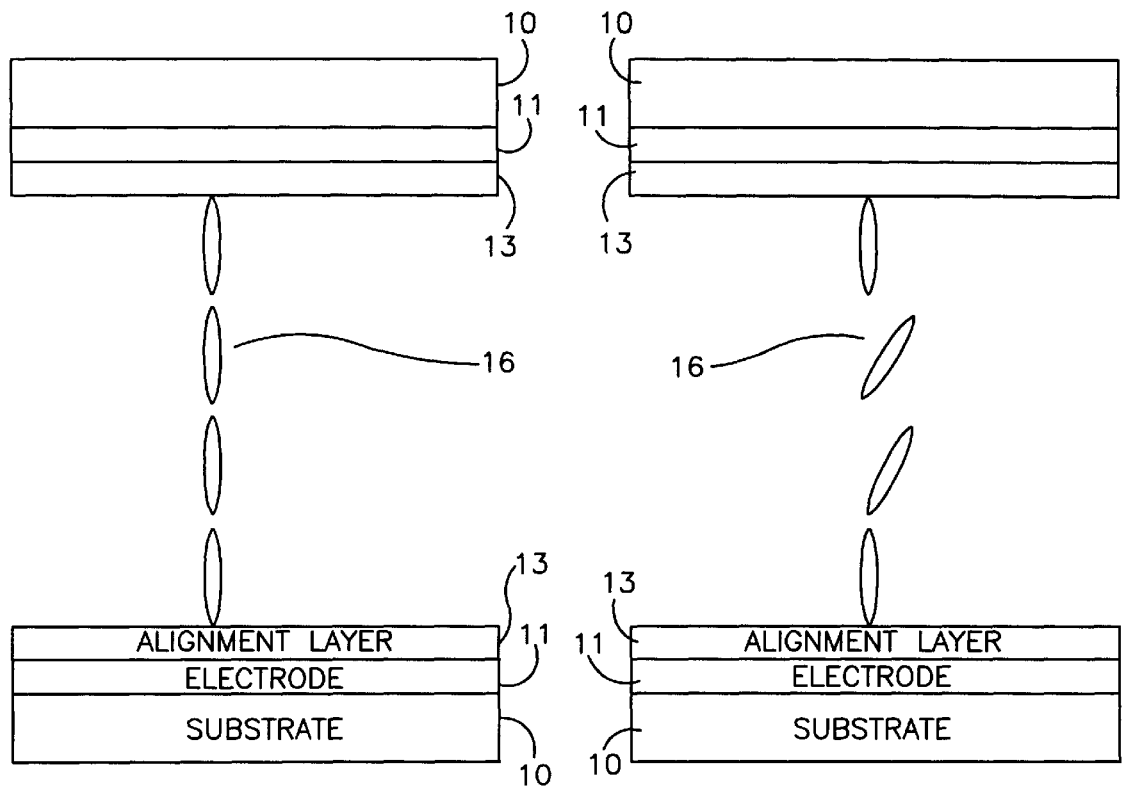
FIGS. 7A and 7B are schematic views of a liquid crystal cell to which the present invention can be applied.

When no voltage is applied across the liquid crystal layer the liquid crystal molecules are aligned homeotropically, as shown in FIG. 7A. When a sufficiently large voltage is applied between the electrodes 11, the liquid crystal molecules will tend to tilt so as to align their short axis more in the direction of the applied field. This is shown in FIG. 7B. If the liquid crystal cell is placed between two polarisers (not shown) then the intensity of the transmitted light will vary with the voltage applied across the liquid crystal layer.

In the device shown in FIGS. 7A and 7B it is, however, disadvantageous to use a true hometropic alignment of the liquid crystal molecules since, in this case, molecules in different regions of the liquid crystal layer 16 will tend to tilt in different directions. Not all molecules will tilt in the plane of the paper as drawn in FIG. 7B, but some could, for example, tilt out of the plane of the paper—all tilt directions out of the alignment shown in FIG. 7A are equivalent. A defect or distortion of the liquid crystal director configuration will occur at a boundary between two regions in which the liquid crystal molecules tilt in different directions, and this will cause undesirable scattering of light and thus reduce the optical contrast of the display.

This problem can be overcome if the conventional alignment layer 13 is replaced by an alignment layer of the present invention which produces a small surface pre-tilt away from 90°. This pre-tilt produces a single favoured direction for tilting of the liquid crystal molecules when a voltage is applied across the liquid crystal layer 16.

EXAMPLE 6

Figure 8:
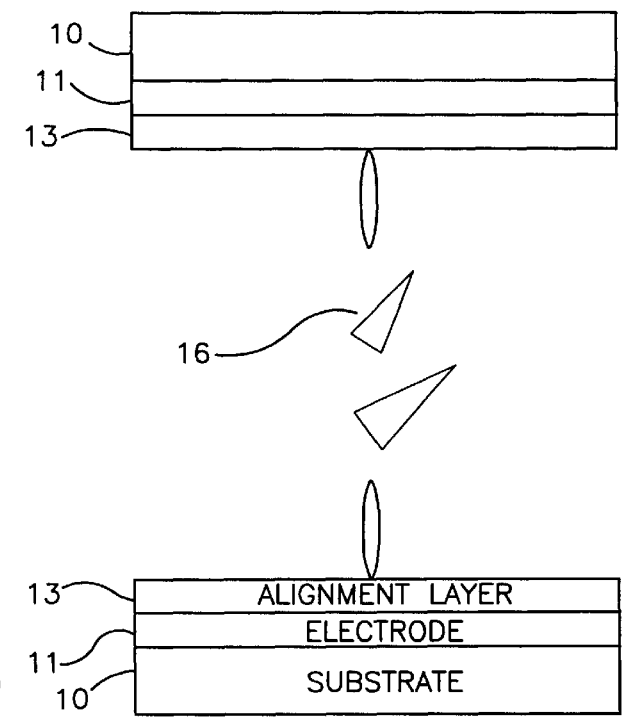
FIG. 8 is a schematic views of another liquid crystal cell to which the present invention can be applied.

A further application of the present invention is described with reference to FIG. 8. This shows a liquid crystal device having the same structure as that shown in FIGS. 7A and 7B. In this device, however, a chiral dopant is added to the liquid crystal 16.

When no voltage is applied across the liquid crystal layer the liquid crystal is homeotropically aligned, just as shown in FIG. 7A. When a voltage is applied across the liquid crystal layer the liquid crystal molecules tilt, as described above in connection with FIGS. 7A and 7B. The presence of the chiral dopant will cause the tilt of the liquid crystal molecules to be accompanied by a twist in the liquid crystal director configuration. This is shown schematically in FIG. 8. The precise nature of the tilt and twist profile will depend on factors such as the amount of chiral dopant, the type of liquid crystal used, and the cell thickness. One known device arranges for the induced twist to be 90° at some applied voltage, thereby producing a homeotropically aligned variant of the well known twisted nematic (TN) liquid crystal display, but other choices of twist exist.

As described above with reference to FIG. 7B, the use of a true homeotropic alignment does not lead to a unique choice of tilt direction for the liquid crystal molecules, and may give rise to regions of different tilt directions and thereby cause optical scattering defects. As with the device shown in FIGS. 7A and 7B, this problem can be overcome if the alignment layer 13 is replaced by an alignment layer of the present invention. The alignment layer of the present invention provides a slightly off-homeotropic alignment of the liquid crystal molecules.

In the examples described above, the polymer alignment layer 12 between the substrate 10 and the reactive mesogen layer 14 has had a spatially uniform rubbing direction or pre-tilt angle. However, it would be possible for the polymer alignment layer 12 to have a spatially varying rubbing direction (pretilt direction) and/or a spatially varying pretilt angle. This would address the problem of the liquid crystal display having non-uniform viewing characteristics as the viewing angle changes. As is well known in the art, if different regions of a liquid crystal display are aligned in different directions, the variations in viewing characteristics due to viewing angle are "averaged out" thereby improving the overall viewing characteristics of the display.

An alignment layer having a spatially varying rubbing direction can be produced by any of the conventional methods. For example, it could be prepared by the method described in Schadt et al, Japanese Journal of Applied Physics Vol. 34 (1995), ppL764–767 in which an alignment direction is defined by exposing a linearly polymerisable photopolymer to linearly polarised light. In this method a surface is masked and is then exposed with light that is linearly polarised in a first direction so that a first rubbing direction is defined in the exposed areas of the surface. This is followed by a second exposure step which uses a second mask, so that different areas of the surface are exposed in the second exposure step. The second exposure step is carried out using light that is linearly polarised in a second direction different from the first direction.

As an alternative to Schadt's materials, Chen et al. in the SID 95 Digest describe a method of repeatedly rubbing conventional polyimide alignment layers through a mechanical mask. The rubbing is carried out such that different sections of the surface are rubbed in different directions.

As a method for producing a surface with spatially varying pretilt angles of polyimide films, Lien et al. in the ASIA DISPLAY 95 pp593–596 discloses method for fabricating Tow-Domain TN panels. According to the description of Lien et al., a single step of UV light exposure of the selected areas of a rubbed polyimide film is added to the conventional single domain LCD process to convert it into a two-domain LCD process.

(Theoretical Background)

It is well known that liquid crystal molecules at an air interface often tend to adopt high pre-tilt angles, which are typically in the range 45–90°. If the liquid crystal molecules are disposed on a surface which is a low pre-tilt surface (for example up to 10°), the liquid crystal molecules will adopt a splayed configuration as shown schematically in FIG. 9.

Figure 9:
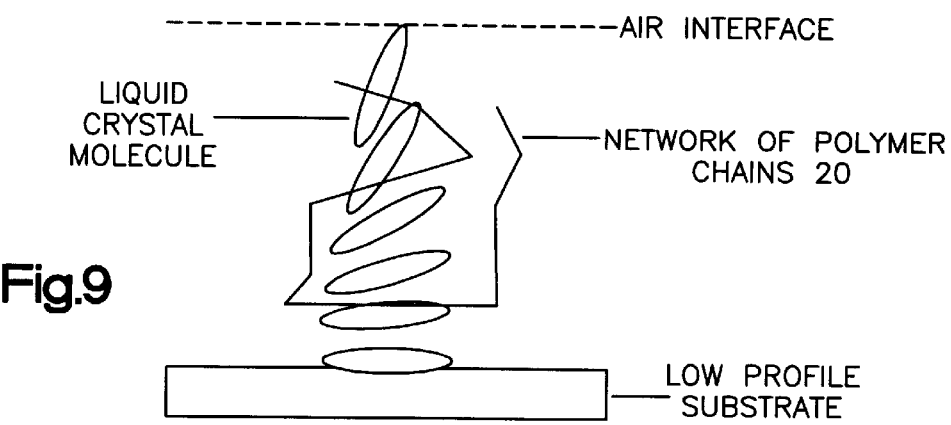
FIG. 9 is a schematic views illustrating the orientation of liquid crystal molecules in a conventional alignment layer.
Figure 10:
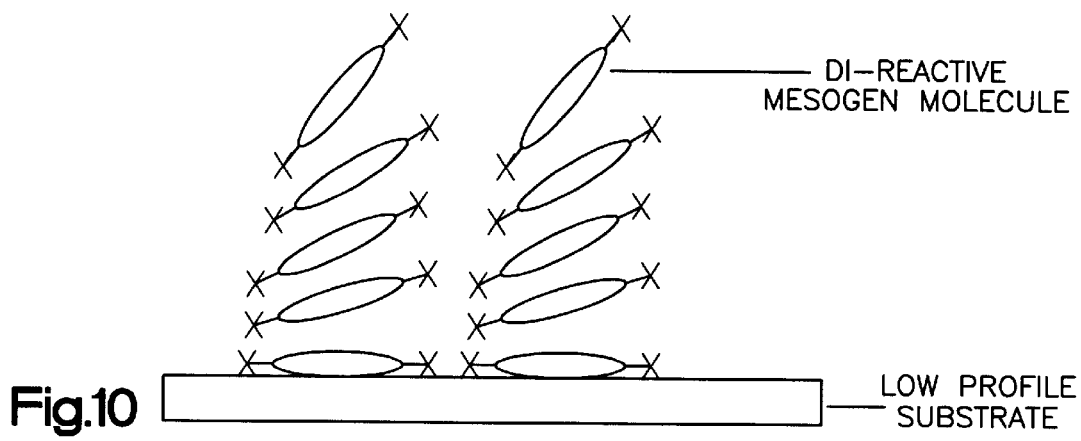
FIG. 10 is a schematic view of the molecular arrangement in a layer of di-reactive mesogen molecules.

It is known that a high pre-tilt alignment layer can be formed from such a splayed liquid crystal configuration by "locking" the molecules in place, using a photocuring polymer. The solid line 20 in FIG. 9 schematically represents a network of polymer chains which lock the liquid crystal molecules in their splayed position. This prior art method of producing an alignment layer is disclosed in EP-A-0 467 456.

In the present invention, the functions of "splaying"and "locking" are combined in a single type of molecule—that is, a reactive mesogen which has photo-cross linking units (indicated by a X) at each end of the molecule. An example of such a reactive mesogen would be a diacrylate such as RM257 or RM258 referred to above. When the mesogen layer is exposed to UV light every "X" must link up with another "X", to create a 3D polymer network. When the mesogen layer is photo-polymerised, the cross linking process will reduce the pre-tilt of the molecules at the air interface. The outer ends of the molecules at the air interface will be pulled towards the substrate, thus reducing the pre-tilt. Accordingly, the photo-cross linking process of the diacrylate molecules will create an alignment layer that has a low pre-tilt. Experimentally it is found that alignment layers composed entirely of RM257 or RM258 have a pre-tilt of less than 10°.

Figure 11:
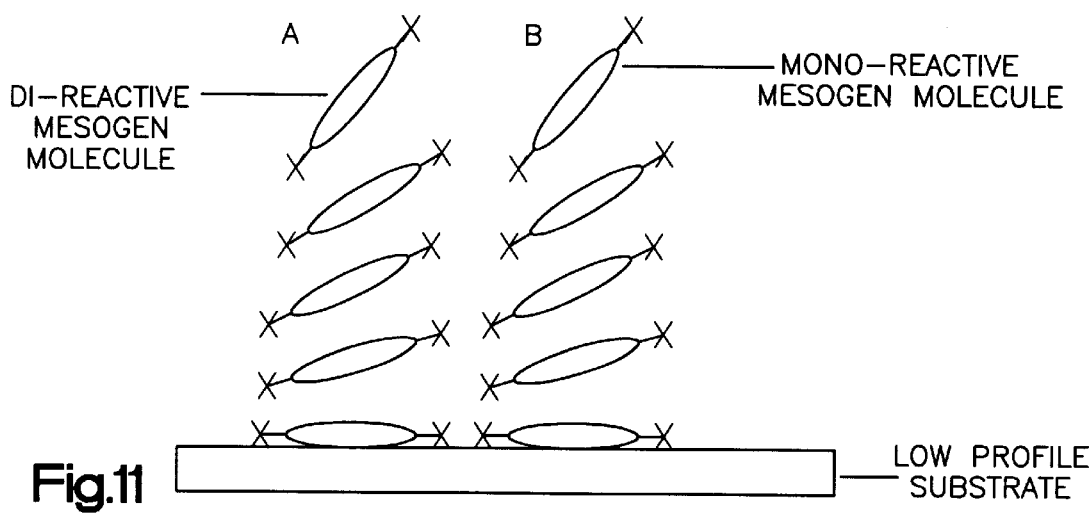
FIG. 11 is a schematic view of the molecular arrangement of a layer including mono-reactive and di-reactive mesogen molecules.

In the present invention the alignment layer is formed from two different reactive mesogens, with the first mesogen having a higher polymerisation functionality than the second mesogen. One example of this is if the first mesogen is di-reactive (that is, each molecule has two photo-cross linking units X), whereas the second molecule is mono-reactive (that is, it has only one photo-cross linking unit X). A layer formed of a mixture of mono-reactive and di-reactive mesogens is schematically shown in FIG. 11, in which the di-reactive molecules are labeled "A" and the mono-reactive molecules are labeled "B". When photopolymerisation occurs, although the di-reactive molecules "A" will be forced to link both ends into the bulk polymer, the molecule "B" can remain with its non-reactive end directed away from the substrate at a high pre-tilt.

Although the invention has been described with reference to some illustrative examples, other guest-host device configurations are well documented, and the use of RM tilted-off homeotropic alignment layers is not confined to the Heilmeier display that we have described above.

Other transmissive and reflective guest-host displays are well known. Double-layered guest-host displays, and the 'Cole and Kashnow' reflective device are well known in the literature (see Scheffer). To the person skilled in the art, the use of the tilted-off homeotropic alignment layer described herein with different dye and LC materials, and with different guest-host display modes will be apparent.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical element, comprising:

a liquid crystal layer; and at least one first alignment layer in contact with the liquid crystal layer, the at least one first alignment layer being formed from a mixture including a first reactive mesogen and a second reactive mesogen, wherein each of the first and second reactive mesogens have at least one polymerizable functional group, and a number of polymerizable functional groups of the second reactive mesogen is smaller than that of the first reactive mesogen, and wherein a ratio of the second reactive mesogen to the first reactive mesogen in the mixture is determined so as to provide a predetermined pretilt angle to liquid crystal molecules in the liquid crystal layer.

2. An optical element according to claim 1, wherein the first reactive mesogen is a liquid crystal molecule having at least one polymerizable functional group at each end thereof.

3. An optical element according to claim 2, wherein the first reactive mesogen is a diacrylate and the second reactive mesogen is a monoacrylate.

4. An optical element according to claim 1, wherein the second reactive mesogen is a liquid crystal molecule having at least one polymerizable functional group at only one end thereof.

5. An optical element according to claim 1, wherein the second reactive mesogen is a liquid crystal molecule having a single polymerizable functional group at only one end thereof.

6. An optical element according to claim 1, wherein the at least one polymerizable functional group of the first and second reactive mesogens is selected from a group consisting of an acrylate group, a methacrylate group, a vinyl ether group and an epoxy group.

7. An optical element according to claim 1, wherein the at least one polymerizable functional group of the first and second reactive mesogens is an acrylate group.

8. An optical element according to claim 1, wherein the ratio of the second reactive mesogen is substantially from greater than 0 wt % to equal to or less than 40 wt % of a total weight of the first and second reactive mesogens.

9. An optical element according to claim 1, wherein the ratio of the second reactive mesogen is substantially from equal to or greater than 5 wt % to equal to or less than 40 wt % of the total weight of the first and second reactive mesogens.

10. An optical element according to claim 1, wherein the ratio of the second reactive mesogen is substantially from equal to or greater than 10 wt % to equal to or less than 30 wt % of the total weight of the first and second reactive mesogens.

11. An optical element according to claim 1, wherein the ratio of the second reactive mesogen is substantially from equal to or greater than 20 wt % to equal to or less than 30 wt % of the total weight of the first and second reactive mesogens.

12. A liquid crystal display device comprising an optical element according to claim 1, and further comprising:
a pair of electrodes opposing each other with the liquid crystal layer interposed therebetween,
wherein the liquid crystal layer is an active layer.

13. An optical element according to claim 1, further comprising a second alignment layer provided on a substrate, the second alignment layer having a first region and a second region,
wherein a pretilt direction of molecules at a surface of the first region and a pretilt direction of molecules at a surface of the second region are different from each other, and
wherein the first alignment layer is provided on the second alignment layer.

14. An optical element according to claim 1, further comprising a second alignment layer provided on a substrate, the second alignment layer having a first region and a second region,
wherein a pretilt angle of molecules at a surface of the first region and a pretilt angle at a surface of molecules at the second region are different from each other, and
wherein the first alignment layer is provided on the second alignment layer.

15. An optical element according to claim 1, further comprising a second alignment layer provided on a substrate, the second alignment layer having a first region and a second region,
wherein a pretilt direction of molecules at the first region and a pretilt direction of molecules at he second region are different from each other,
wherein a pretilt angle of molecules at the first region and a pretilt angle of molecules at the second region are different from each other, and
wherein the first alignment layer is provided on the second alignment layer.

16. A liquid crystal display device, comprising:
a liquid crystal layer;
alignment layers disposed on opposite sides of the liquid crystal layer, at least one of said alignment layers being formed of a mixture including first reactive mesogen and a second reactive mesogen; and
a pair of electrodes opposing each other with the liquid crystal layer interposed therebetween,
wherein each of the first and second reactive mesogens have at least one polymerizable functional group, and a number of polymerizable functional groups of the second reactive mesogen is smaller than that of the first reactive mesogen, and
wherein a ratio of the second reactive mesogen to the first reactive mesogen in the mixture is determined so as to provide a predetermined pretilt angle to liquid crystal molecules in the liquid crystal layer.

* * * * *